Oct. 24, 1944.  O. F. ARTHUR  2,361,163
WIRE MAT
Filed Oct. 7, 1942   5 Sheets-Sheet 2

INVENTOR
Oscar F. Arthur
By Archworth Martin
His Attorney

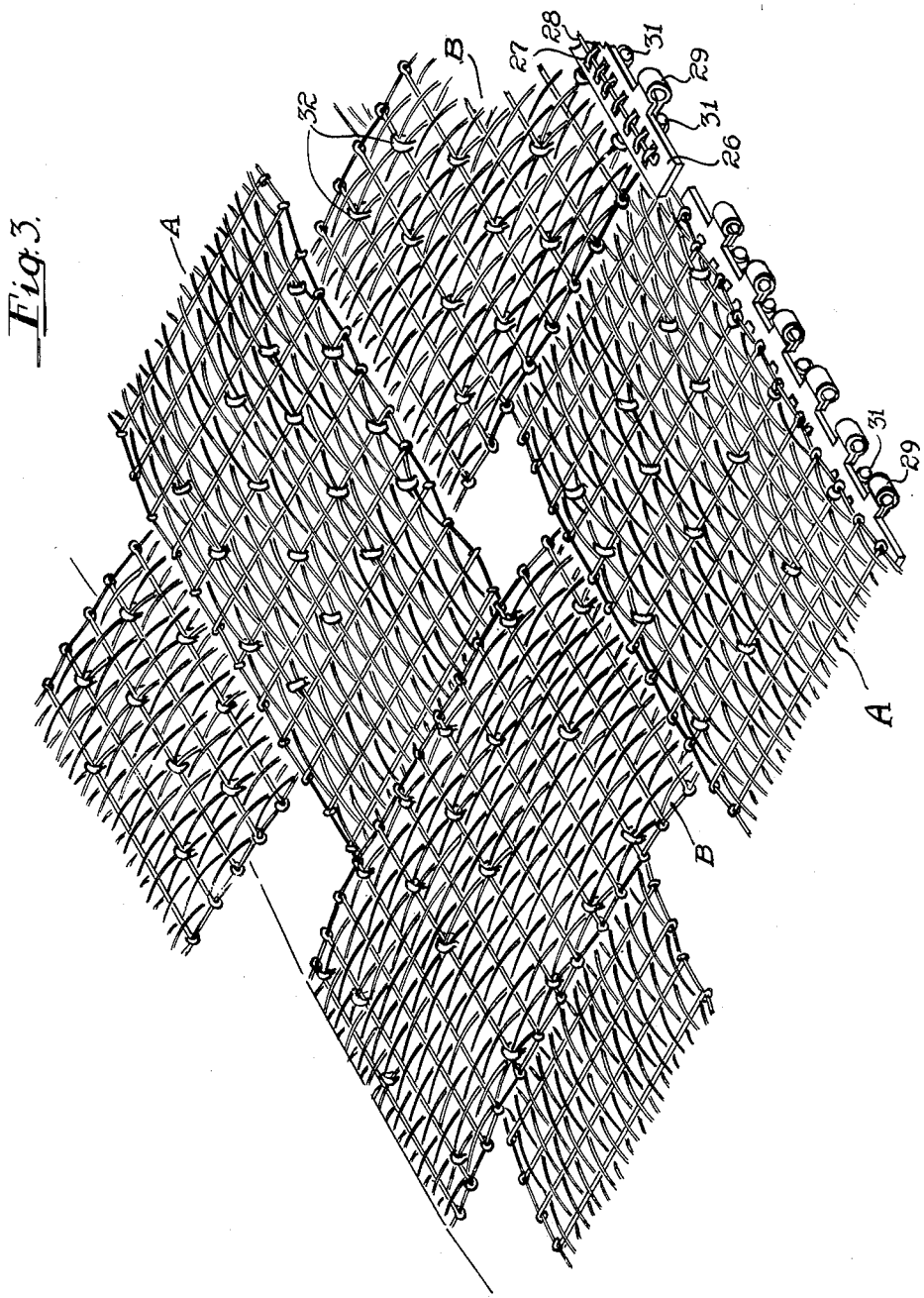

Oct. 24, 1944.　　　O. F. ARTHUR　　　2,361,163
WIRE MAT
Filed Oct. 7, 1942　　　5 Sheets-Sheet 4
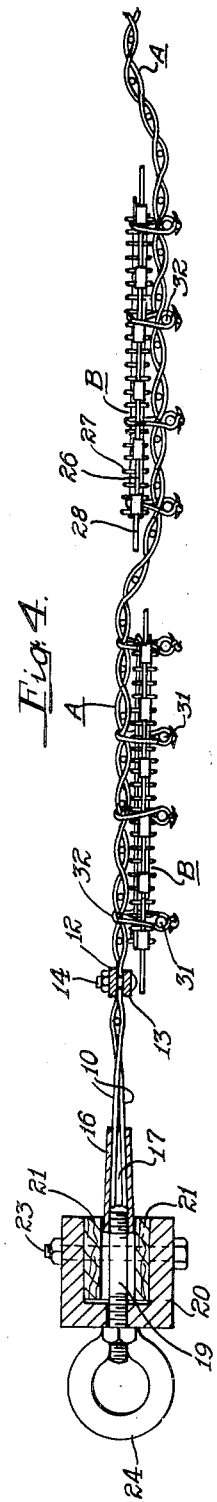
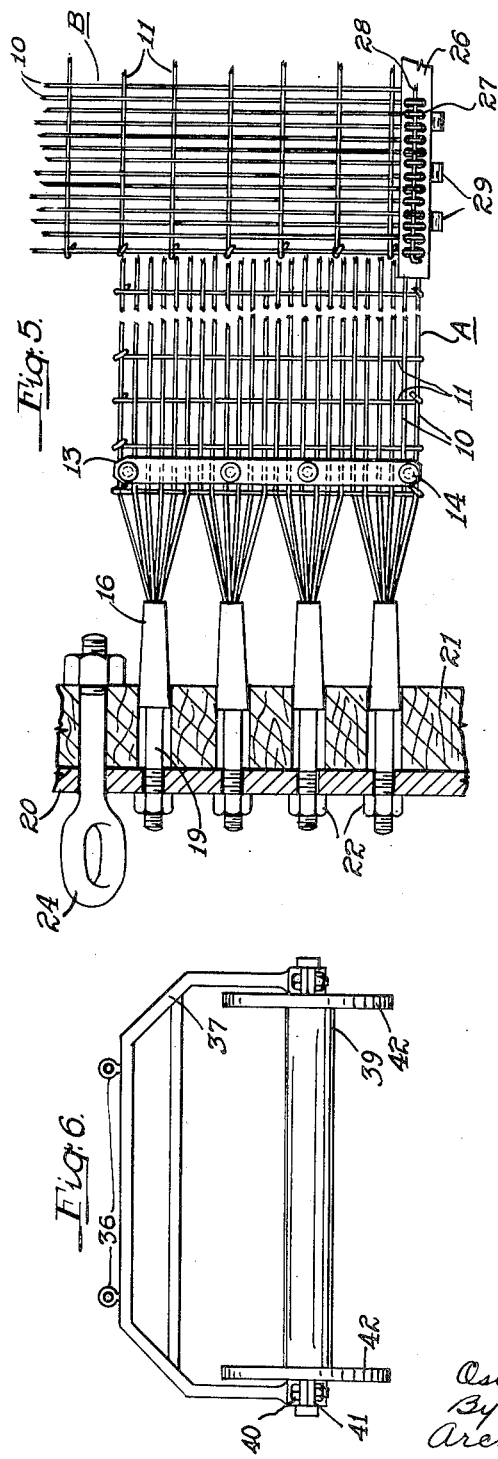
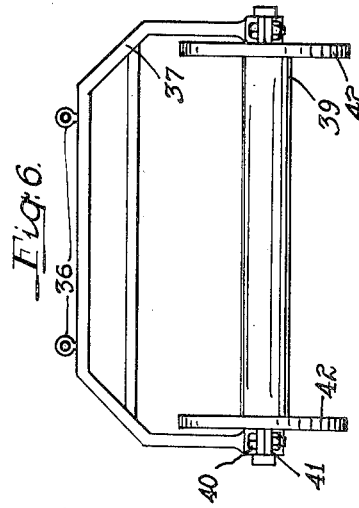
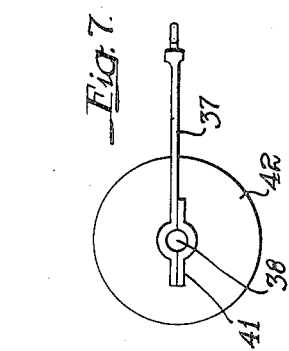
INVENTOR
Oscar F. Arthur
By Archworth Martin
His Attorney Oct. 24, 1944. O. F. ARTHUR 2,361,163
WIRE MAT
Filed Oct. 7, 1942 5 Sheets-Sheet 5
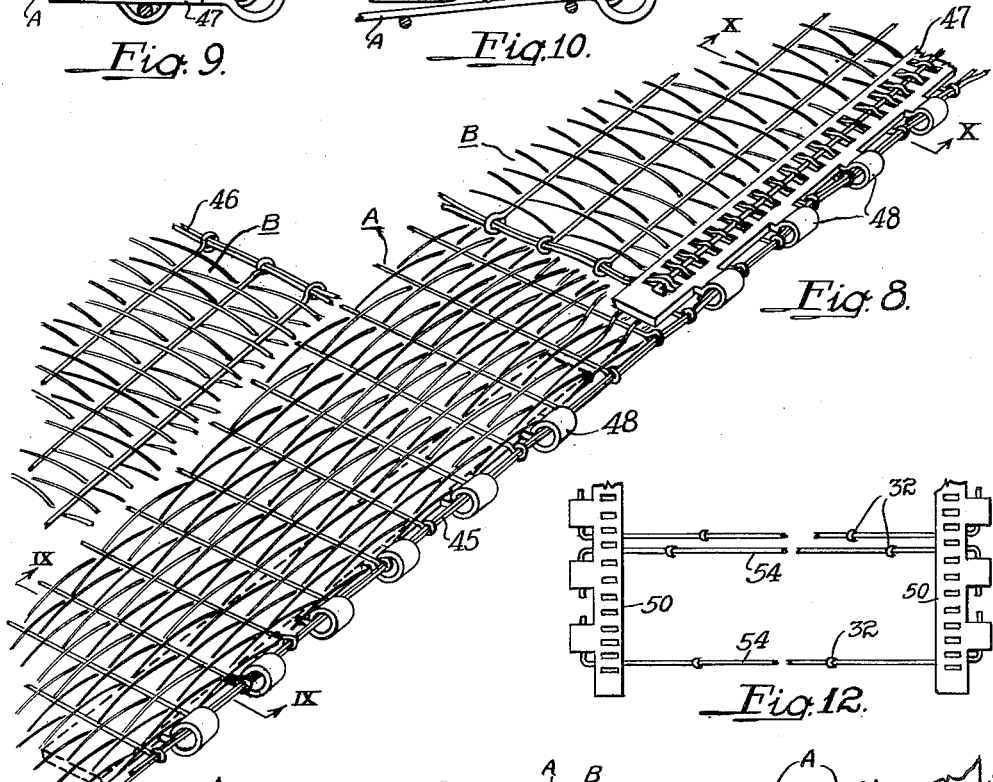

Patented Oct. 24, 1944

2,361,163

UNITED STATES PATENT OFFICE 2,361,163

WIRE MAT

Oscar F. Arthur, Belle Vernon, Pa.

Application October 7, 1942, Serial No. 461,099

8 Claims. (Cl. 94—4)

My invention relates to mats, and more particularly to mats of wire mesh that are especially suited for use as landing mats and beach aprons, to facilitate transfer of vehicles, etc., from ship to shore, or from landing barges. The mat structure is also intended for use on soft swampy or sandy ground, and for crossing streams, to serve as truck tracks, landing fields for airplanes, etc. The invention is capable of various other uses, such as hangar floors and bomb shelters.

One object of my invention is to provide a mat of such form that it can be transported and laid more readily than other forms of mats, and which can be easily taken up and moved from place to place.

Another object of my invention is to provide a mat which, while it is flexible and yieldable to various surface contours, will not become so permanently distorted in service as to prevent reuse thereof in various localities.

Still another object of my invention is to provide a mat structure and laying device therefor of such form that it can be caused to spread itself automatically from ship to shore, or on swampy terrain, in advance of equipment or men who will travel over the same.

Figure 1:
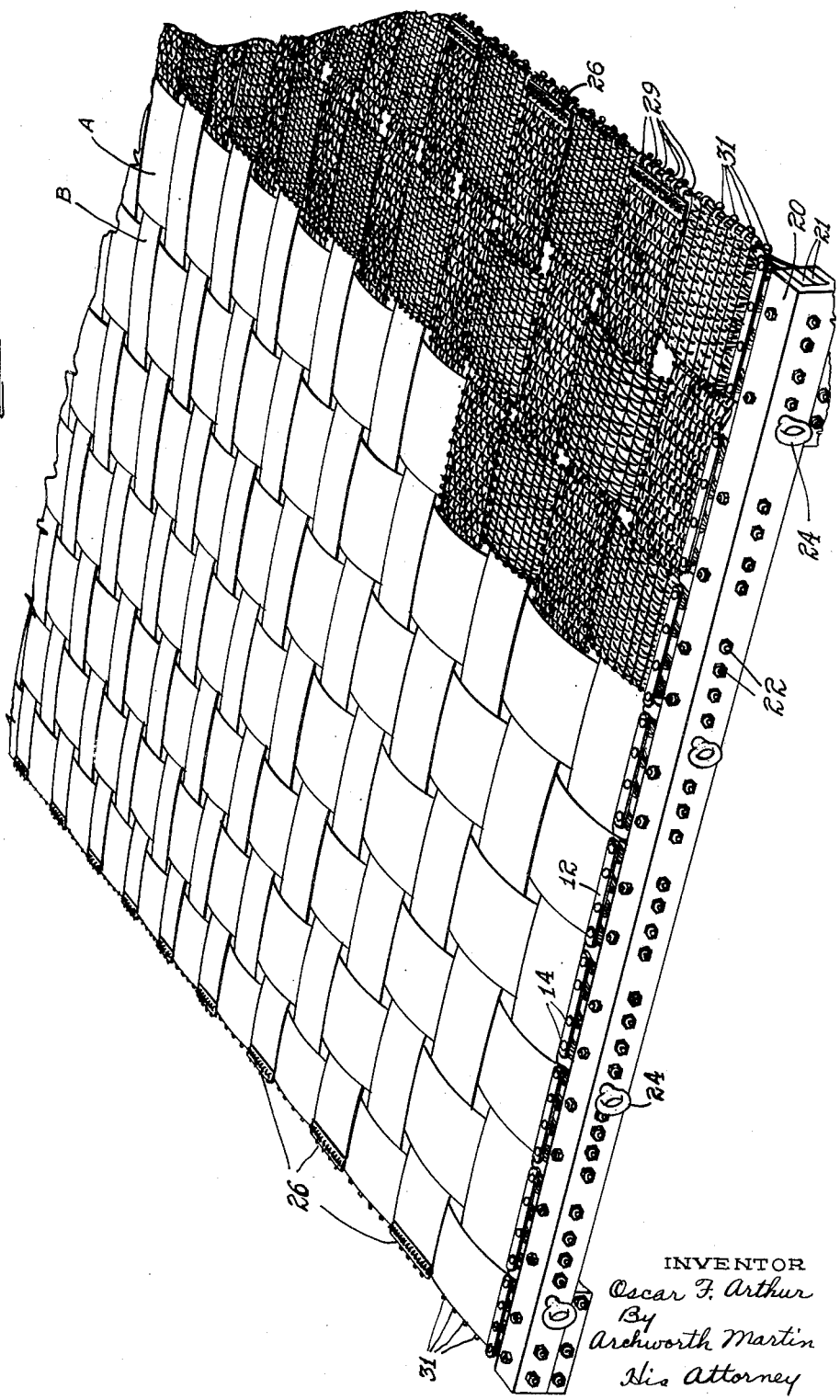
Figure 2:
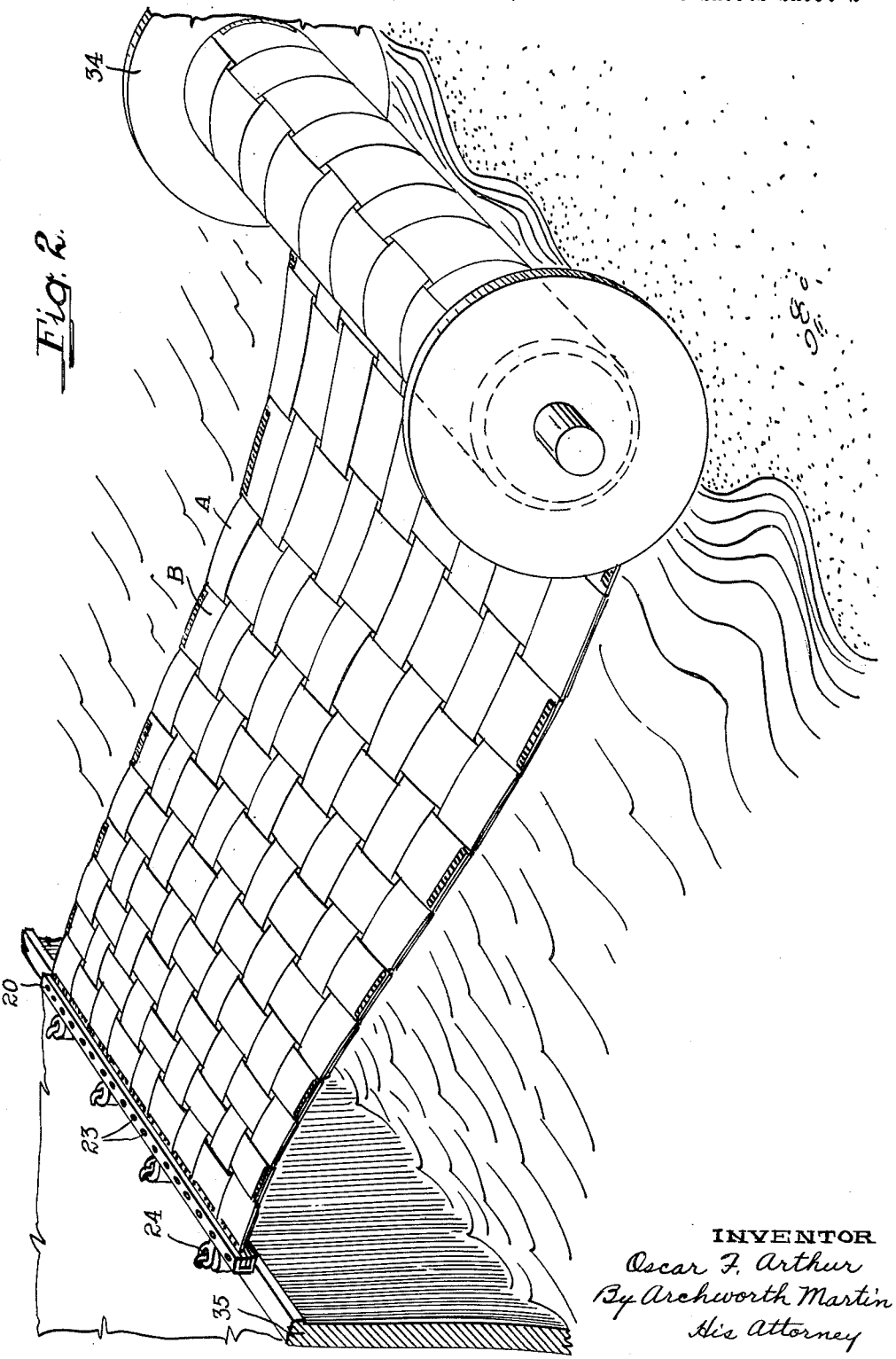

One form which my invention may take is shown in the accompanying drawings wherein Figure 1 is a perspective view of a portion of a mat section; Fig. 2 is a perspective view of the mat of Fig. 1, on a reduced scale, showing one manner in which it may be placed and used as a landing mat; Fig. 3 is a perspective view on an enlarged scale of a portion of the mat structure of Figs. 1 and 2; Fig. 4 is a longitudinal sectional view of the mat of Fig. 1, on a larger scale; Fig. 5 is a sectional plan view of a portion of the mat structure of Fig. 4; Fig. 6 is a plan view of a wheeled drum on which the mat of Fig. 1 may be wrapped and transported; Fig. 7 is an end view of the drum and truck device of Fig. 6; Fig. 8 is a perspective view of a modified form of mat showing means for connecting the longitudinal bands to the ends of the transverse bands, at the edges of the mat; Figs. 9 and 10 are enlarged views taken on the lines IX—IX and X—X respectively of Fig. 8; Fig. 11 shows another manner in which stiffening rods may be embodied in the mat structure, and Fig. 12 shows still another modification of this feature.

The mat comprises a series of longitudinally-extending bands A and transversely-extending bands B, the bands A extending for the full length of a mat, and the bands B extending the full width thereof. The bands A extend alternately over and under the bands B and the bands B extend over and under alternate bands A, as shown in Figs. 1 and 2, after the manner of a basket weave.

As shown more clearly in Fig. 5, each band A is composed of strand wires 10 and stay wires 11. These wires may conveniently be of hard drawn wire or spring steel, so that they will not easily become permanently bent in use or through handling, the bands being further resistant to such deformation because the strands can have slight sliding movement on the stays 11. The resiliency of the wires will be such that when wrapped upon a drum, as hereinafter explained, the mat will unroll, carrying the drum with it, when the free end of the mat is held or anchored. The strand wires 10 are intermeshed with the stay wires 11 by passing them over and under successive stays, the stays in turn, of course, passing over and under successive strand wires. The stay wires may conveniently be about 14 inches long, and at their ends are clamped around the marginal strand wires, the strand wires being of any suitable length depending upon the length of mat section desired—which may be some hundreds of feet.

The strands 10 that are included in each band A are secured near their ends in relatively rigid relation by clamping plates 12 and 13 and bolts 14. The extremities of the strands 10 are arranged in groups for connection to cable clamps. In this instance, each cable clamp comprises a tapered sleeve 16 within which is located a tapered pin 17. The end portions of each group of strands are arranged around the pin 17, so that when a pulling force is exerted, the ends will be jammed or clamped against slipping relative to the anchoring sleeve. This is an arrangement well known in the art.

Each sleeve 16 has threaded connection with an adjusting screw or bolt 19 that extends through a metal channel 20 and between filler strips 21 located in the channel, and which may conveniently be of wood, with recesses or bores to receive the sleeves 16. Both ends of the mat will usually be provided with these tensioning and clamping devices, the groups of wires 10 being adjusted in longitudinal directions by turning of nuts 22 on the bolts 19. The filler strips 21 are held in place by bolts 23. Eye bolts 24 are provided on the bar 20 for use in anchoring the end of the mat to a fixed support such as a boat deck or stakes on land, or to connect mats in end-to-end relation.

While the bands B have their strand wires and stay wires interwoven in substantially the same manner as are the wires of bands A, the strands of the bands B have their ends connected to plates or bars 26, as described and claimed in my copending application Serial No. 537,989, filed April 7, 1942 (now Patent No. 2,315,180, issued March 30, 1943). That is to say, the plates 26 have slots for the reception of deflections or bends 27 formed near the ends of the strand wires, retaining rods or wires 28 being inserted between such bends and the plates 26. The plates 26 also carry hinge knuckles 29 whereby a number of longitudinally-extending mat sections can be connected together in edge-to-edge relation, as set forth in my said application.

When the mat is to be used with equipment of great weight such as in the movement of trucks and tractor tanks from ship to shore or across soft terrain, I will incorporate therewith stiffening rods 31 that extend crosswise of the mat for preferably the full width thereof. These rods may suitably be number 3 size or even greater. These rods not only stiffen the mat, but prevent the mid section thereof bulging upwardly against the underside of vehicles when the wheels tend to depress the mat along their lines of travel. Wire clips 32 are employed for holding the rods in position against the underside of the mat. The clips are shown as wires bent to U-form and inserted over certain of the strand and stay wires of the mesh, and having their lower ends twisted as shown in Fig. 4. Since the rods 31 extend transversely of the mat, they will not interfere with wrapping of the mat on a drum. These clips can also be used to hold the ends of the bands B in place against the bands A when no rods are employed.

The bands A and B may each suitably be of 12 to 14 inches in width, the bands A being slightly spaced apart from one another, and the bands B similarly spaced from one another, as shown in Figs. 1 and 3, to facilitate coiling of the mat and to give it flexibility in use without weakening it.

In Fig. 2 the mat is shown as partially unwrapped from a drum 34, the free end of the mat being secured to the deck 35 of a ship or barge, preliminary to effecting a landing operation. In this instance, the bar 20 is secured to the deck 35 and the drum 34 rolled overboard. Thereupon the resiliency of the mat is such that it will rotate the drum toward the beach, the drum preferably having a tightly sealed air chamber and being of sufficient buoyancy to support the mat. When the drum reaches the beach, it will continue to travel, under the unrolling force of the mat. The shore end of the mat can then be anchored to stakes or trees, whereupon vehicles and men can freely move from the boat to the shore.

The mat can be laid across swampy ground or streams in a somewhat similar manner, to provide a traveling surface for the movement of men and equipment.

In Figs. 6 and 7, I show a trailer-like carting device whereby a mat roll may be towed. The cart may be hitched to a motor vehicle through the medium of eye bolts 36, after the manner of a trailer. These bolts are carried by a frame 37 whose arms are detachably connected to shaft-like extensions 38 on the ends of a spool 39, by bolts 40 and a bearing element 41. The mat is wrapped on the body of the spool 39 and the disc-like end portions 42 of the spool serve as wheels.

The free end of the mat will, of course, be anchored in place on the mat roll, so that it will be held snugly in position on the spool while being transported.

When the place of installation is reached, the free end of the mat can be anchored and the cart pulled along until it is unrolled, or the arms of the frame 37 can be disconnected from the spool, whereupon the outer end of the mat is anchored and the spool released to roll along the ground or across water, under the uncoiling force of the mat. The spool may have sufficient buoyancy that it will float and support the weight of the mat in water, during the uncoiling operation. The mat can readily be taken up and removed, by fastening one end to the spool and pulling the spool in a direction to again coil the mat thereon.

Referring now to Figs. 8, 9 and 10, I show bands A and B of substantially the form shown in Fig. 5, but in this instance two marginal or selvage wires 45 are provided along the edges of the bands A and double wires 46 similarly provided along the edges of the bands B, instead of the single marginal wires as in Fig. 5. In this structure the ends of the bands B are connected to plates 47 which correspond to the plates 26. The plates 47, however, have their knuckles 48 bent only partially toward their closed position when the bands B are first assembled with the plates 47. When the bands A and B are interwoven, the marginal selvage wires 45 of the bands A are inserted into the knuckles 48 and the knuckles then tightly pressed to closed position, as shown in Figs. 9 and 10, to thus connect the outermost edges of the bands A to the plates 47. Since certain of the bands B overlie the bands A at the edges of the mat, and intermediate bands B underlie such bands A, it is desirable to have the knuckles on the plates of the overlying bands B open at the underside of the plate as in Fig. 10, while the knuckles of the plates will be open at the upper side of the plate as in Fig. 9.

The bands are thus firmly connected along the longitudinal edges of the mat and there is less tendency for the bands A to be drawn inwardly at their edges, under weights imposed on the mats.

Referring now to Fig. 11, I show an arrangement wherein bands A and B may be formed as in Figs. 1 to 5, and wherein end plates 50 are provided on the bands B, that correspond to either the plates 26 or 47. However, this arrangement differs from the structure of Figs. 1 and 4, in that the stiffening rods at the underside of the mat are connected to the plates 50 instead of being clipped only to the mesh. In this instance, the stiffening rods are indicated by the numeral 51 and are of generally U-form. Each rod extends through a pair of knuckles 52 at one edge of the mat and underlies the mat, the extremities 53 of the rod extending into knuckles at the opposite edge of the mat. The rod can be inserted through the knuckles and bent while being placed in position, or the knuckles can be initially in partially open position to receive the previously-formed rods, after which the knuckles can be crimped tightly closed around the rods. The rods will be secured to the mesh at desired intervals by clips 32 as are the rods 31. The rods 51 do not materially interfere with the rolling of the mat, but will serve as braces or stays to prevent inward drawing of the longitudinal edges of the mat under the weight of vehicles traveling thereon. If desired, the rods can simply be welded to the plates.

In Fig. 12 I show a somewhat different arrangement wherein rods 54 serve the same purpose as the rods 51, but each rod extends only once across the mat and has its ends laterally turned for insertion in the knuckles of the plates 50. These rods have the advantage of being more easily inserted into the knuckles than the rods 51.

Another advantage of my mat structure is that the bands A and B can be woven in the field for use particularly where it is not necessary to have the mat under tension, and where the end bars 20 are not required. In such case, a series of bands A will be unrolled from individual rolls, and during such laying of the bands A, bands B will be unrolled crosswise of the bands A, in proper sequential relation, to secure the basket weave effect of Fig. 3. The edges of a mat thus formed on the field may be anchored by digging trenches at the edges of the mat into which such edges are depressed. Stakes are then driven through the mat and the dirt can be backfilled and tamped.

I claim as my invention:

1. A mat comprising longitudinally-extending mesh-like bands of flexible material extending longitudinally of the mat, similarly formed bands extending transversely of the first-named bands and interwoven therewith, longitudinally-extending stiffening bars or the like on the ends of each transverse band, the bars at each side being arranged in end-to-end relation, and connections between the bars and the adjacent edges of the longitudinal bands.

2. A mat comprising longitudinally-extending mesh-like bands of flexible material extending longitudinally of the mat, similarly formed bands extending transversely of the first-named bands and interwoven therewith, stiffening bars or the like on the ends of each transverse band, and rods extending transversely of the mat and having their ends connected to the bars.

3. A mat comprising longitudinally-extending mesh-like bands of flexible material extending longitudinally of the mat, similarly formed bands extending transversely of the first-named bands and interwoven therewith, stiffening bars or the like on the ends of each transverse band, and rods extending transversely of the mat and having their ends connected to the bars, and being connected to the mat at points intermediate their ends.

4. A wire mat comprising longitudinally-extending generally flat bands of strand wires and stay wires that are interwoven, and similarly formed bands extending transversely of the first-named bands and interwoven therewith, the transverse bands being spaced apart substantial distances, to facilitate bending of the mat on transverse axes, the ends of the transverse bands being directly connected to the adjacent longitudinal band at each edge of the mat.

5. A wire mat comprising longitudinally-extending generally flat bands of strand wires and stay wires that are interwoven, similarly formed bands extending transversely of the first-named bands and connected thereto, the transverse bands being spaced apart substantial distances, to facilitate bending of the mat on transverse axes, and longitudinally-extending bars on the ends of each transverse band, the said bars being longitudinally spaced from one another at the spaces between the transverse bands.

6. A mat comprising mesh-like bands of a flexible material extending longitudinally of the mat, similarly formed bands extending transversely of the first-named bands and interwoven therewith, stiffening bars or the like on the ends of each transverse band, and each bar extending approximately only the full width of its associated transverse band, and connections between the bars and the adjacent edges of the longitudinal bands.

7. A mat comprising mesh-like bands of flexible material extending longitudinally of the mat, flexible bands extending transversely of the first-named bands and interwoven therewith, and rods extending transversely of the mat and having their ends connected to the adjacent extremities of the transversely-extending bands.

8. A mat comprising mesh-like bands of flexible material extending longitudinally of the mat, similarly formed bands extending transversely of the first-named bands, the longitudinal bands extending over and under the transverse bands alternately, and the transverse bands extending over and under the longitudinal bands alternately, bars secured to the ends of each transverse band, and means for connecting the ends of the transverse bands to the adjacent longitudinal bands, the transverse bands and their respective bars being spaced apart substantial distances in directions longitudinally of the mat, to facilitate bending at predetermined transversely extending zones.

OSCAR F. ARTHUR.